(12) United States Patent
Bauer et al.

(10) Patent No.: US 6,372,709 B1
(45) Date of Patent: Apr. 16, 2002

(54) FINELY DIVIDED CRYSTALLINE SODIUM DISILICATE

(75) Inventors: Harald Bauer, Kerpen; Josef Holz; Günther Schimmel, both of Erftstadt, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/346,427

(22) Filed: Jul. 1, 1999

(30) Foreign Application Priority Data

Jul. 8, 1998 (DE) .......................... 198 30 591
Jun. 8, 1999 (DE) .......................... 199 25 928

(51) Int. Cl.$^7$ ................................. C11D 7/14
(52) U.S. Cl. .................. 510/511; 510/276; 510/325; 510/334; 510/377; 510/460; 510/466; 510/477; 510/508; 510/531; 510/532
(58) Field of Search .................. 510/276, 325, 510/334, 377, 460, 466, 477, 511, 508, 531, 532

(56) References Cited

U.S. PATENT DOCUMENTS

| 4,664,839 A | * | 5/1987 | Rieck ................. 252/175 |
| 4,820,439 A | | 4/1989 | Rieck |
| 5,268,156 A | | 12/1993 | Schimmel et al. |
| 5,356,607 A | | 10/1994 | Just ................. 423/334 |
| 5,780,420 A | | 7/1998 | Breuer et al. |
| 6,025,317 A | * | 2/2000 | Stein et al. ................. 510/360 |

FOREIGN PATENT DOCUMENTS

| DE | 41 07 230 | 9/1992 |
| DE | 43 23 527 | 1/1995 |
| DE | 197 07 449 | 4/1998 |
| EP | 0 164 514 | 12/1985 |
| EP | 0 853 118 | 7/1998 |
| JP | 9-202892 | 8/1997 |
| WO | WO 91/08171 | 6/1991 |
| WO | 97/19156 | * 5/1997 |
| WO | WO 97/19156 | 5/1997 |

OTHER PUBLICATIONS

EPO Search Report.
Dewent Patent Family Abstract.
Derwent Patent Family Abstract.
Derwent Patent Family Abstract.
Front Page of German Patent No. 44 00 024, Published Jul. 6, 1995; See AD Above For English Translation.
esp 169@cenet abstract for JP9202892

* cited by examiner

Primary Examiner—Yogendra N. Gupta
Assistant Examiner—Charles Boyer
(74) Attorney, Agent, or Firm—Susan S. Jackson; Scott E. Hanf

(57) ABSTRACT

The invention relates to a finely divided crystalline layered sodium disilicate of the formula $NaMSi_xO_{2x+1} \cdot yH_2O$, where M is sodium or hydrogen, x is a number from 1.9 to 4, and y is a number from 0 to 20, which comprises from 0 to 40% by weight of alpha-disodium disilicate
from 0 to 40% by weight of beta-disodium disilicate
from 40 to 100% by weight of delta-disodium disilicate
from 0 to 40% by weight of amorphous components, to a process for its preparation and to its use.

23 Claims, No Drawings

FINELY DIVIDED CRYSTALLINE SODIUM DISILICATE

The invention relates to a finely divided crystalline layered sodium disilicate of the formula $NaMSi_xO_{2x+1} \cdot y H_2O$, where M is sodium or hydrogen, x is a number from 1.9 to 4, and y is a number from 0 to 20, to a process for its preparation and to its use.

Crystalline layered sodium silicates (phyllosilicates), in particular those of the formula $NaMSi_xO_{2x+1} \cdot yH_2O$, where M is sodium or hydrogen, x is a number from 1.9 to 4, and y is a number from 0 to 20, and preferred values for x are 2, 3 or 4, have proven to be suitable replacements for the builders phosphate and zeolite, especially in detergents and cleaners.

The use of the abovementioned crystalline phyllosilicates for softening water is described, for example, in EP-A-0 164 514. Preferred crystalline phyllosilicates are those in which M is sodium and x assumes the values 2 or 3.

Preferred replacements are either beta- or delta-sodium disilicates ($Na_2Si_2O_5 \cdot yH_2O$), it being possible to obtain beta-sodium disilicate, for example, by the process in PCT/WO 91/08171.

A commercially available crystalline sodium disilicate which corresponds to the abovementioned formula is, for example, SKS-6 from Clariant GmbH. This product is composed of the various polymorphous phases of sodium disilicate and thus consists of alpha-disodium disilicate, beta-disodium disilicate and delta-disodium disilicate. Preference is given to as high as possible a content of delta-disodium disilicate. The commercial product may also comprise components of noncrystallized sodium silicate.

The aim has hitherto always been to prepare sodium disilicates which comprise as high a content as possible of only one polymorphous phase, such as, for example with a delta-disodium silicate content of more than 90% by weight or above.

The sodium disilicates known hitherto can already satisfy a large number of the requirements placed on them. For example, they generally have high calcium-binding capacity and their other washing and performance properties are sufficient for many areas.

However, there continues to be a requirement for suitable substances which have very high calcium-binding capacity and at the same time produce only small dissolution residues in water (referred to below as sieve residue).

This object is achieved by a finely divided crystalline layered sodium disilicate of the type mentioned at the outset, which comprises from 0 to 40% by weight of alpha-disodium disilicate
from 0 to 40% by weight of beta-disodium disilicate
from 40 to 100% by weight of delta-disodium disilicate
from 0 to 40% by weight of amorphous components.

The abovementioned alpha-disodium disilicate corresponds to the Na SKS-5 described in EP 0 164 514 B1, characterized by the X-ray diffraction data reproduced therein, which are assigned to the alpha-$Na_2Si_2O_5$, whose X-ray diffraction patterns are registered with the Joint Committee of Powder Diffraction Standards under the numbers 18-1241, 22-1397, 22-1397A, 19-1233, 19-1234, 19-1237.

The abovementioned beta-disodium disilicate corresponds to the Na SKS-7 described in EP 0 164 514 B1, characterized by the X-ray diffraction data reproduced therein which are attributed to the beta-$Na_2Si_2O_5$, whose X-ray diffraction patterns are registered with the Joint Committee of Powder Diffraction Standards under the numbers 24-1123, 29-1261.

The abovementioned delta-disodium disilicate corresponds to the Na SKS-6 described in EP 0 164 514 B1, characterized by the X-ray diffraction data reproduced therein which are attributed to the beta-$Na_2Si_2O_5$, whose X-ray diffraction patterns are registered with the Joint Committee of Powder Diffraction Standards under the number 22-1396.

The finely divided crystalline layered sodium disilicate according to the present invention is notable for a binding capacity for water hardeners (calcium-binding capacity) which is greater compared with the prior art, and also for the fact that the dissolution residues in water (defined below by the sieve residue) are considerably reduced.

Preferably, the finely divided crystalline layered sodium disilicate comprises from 0 to 20% by weight of alpha-disodium disilicate
from 0 to 30% by weight of beta-disodium disilicate
from 50 to 95% by weight of delta-disodium disilicate
from 0 to 20% by weight of amorphous components.

Particularly preferably, the finely divided crystalline layered sodium disilicate comprises from 0 to 10% by weight of alpha-disodium disilicate
from 0 to 15% by weight of beta-disodium disilicate
from 70 to 90% by weight of delta-disodium disilicate
from 0 to 10% by weight of amorphous components.

The finely divided crystalline layered sodium disilicate is preferably free from sodium metasilicate or NS phases. It is also free from so-called NS phases, as defined, for example, in PCT/WO 97/19156 and in JP 7/327995 A1 and to which reference is here expressly made.

Preferably, the finely divided crystalline layered sodium disilicate has a $d_{90}$ value of <100 μm.

Preferably, the finely divided crystalline layered sodium disilicate has a $d_{90}$ value of <60 μm.

Preferably, the finely divided crystalline layered sodium disilicate has a calcium-binding capacity of more than 170 mg of $CaCO_3$/g at 30° C. and 17° German hardness.

Particularly preferably, the finely divided crystalline layered sodium disilicate has a calcium-binding capacity of more than 180 mg of $CaCO_3$/g at 30° C. and 17° German hardness.

In particular, the finely divided crystalline layered sodium disilicate has a calcium-binding capacity of more than 190 mg of $CaCO_3$/g at 30° C. and 17° German hardness.

Preferably, the finely divided crystalline layered sodium disilicate has a sieve residue of less than 60%.

Preferably, the finely divided crystalline layered sodium disilicate has a sieve residue of less than 40%.

Preferably, the finely divided crystalline layered sodium disilicate has a sieve residue of less than 30%.

The invention also relates to a process for the preparation of finely divided crystalline layered sodium disilicates, which comprises grinding a sodium phyllosilicate having a particle diameter $d_{50}$ of from 80 to 400 μm to a $d_{90}$ value of <100 μm.

Preferably, the finely divided crystalline layered sodium disilicate is ground to a $d_{90}$ value of <60 μm in the above process.

Preferably, the process is carried out using a vibrating mill, ball mill, roller mill, pendulum roller mill or air-jet mill.

The invention also relates to the use of the finely divided crystalline layered sodium disilicates according to the invention for the preparation of detergents and cleaners, including dishwashing detergents.

The invention likewise relates to the use of the finely divided crystalline layered sodium disilicates according to the invention as builders.

The invention likewise relates to detergents and cleaners which comprise a finely divided crystalline layered sodium disilicate according to the invention, in particular in addition to other ingredients, active ingredients and auxiliaries. The amounts given below are, despite it not always being expressly mentioned, made up to a total of 100% by weight by customary ingredients, active ingredients and auxiliaries for detergents and cleaners.

Preferably, such detergents and cleaners comprise from 1 to 80% by weight of the finely divided crystalline layered sodium disilicate according to the invention.

Preferably, such detergents and cleaners comprise from 1 to 80% by weight of zeolite and from 1 to 80% by weight of the finely divided crystalline layered sodium disilicate according to the invention.

Preferably, such detergents and cleaners comprise from 1 to 80% by weight of zeolite, from 1 to 80% by weight of crystalline sodium phyllosilicate and from 1 to 80% by weight of the finely divided crystalline layered sodium disilicate according to the invention.

Preferably, such detergents and cleaners comprise from 1 to 80% by weight of the finely divided crystalline layered sodium disilicate according to the invention and from 1 to 10% by weight of citric acid or salts of citric acid.

Preferably, such detergents and cleaners comprise from 1 to 80% by weight of zeolite, from 1 to 80% by weight of the finely divided crystalline layered sodium disilicate according to the invention and from 1 to 10% by weight of citric acid or salts of citric acid.

Preferably, such detergents and cleaners comprise from 1 to 80% by weight of the finely divided crystalline layered sodium disilicate according to the invention and from 0.5 to 5% by weight of modified cellulose.

Preferably, such detergents and cleaners comprise from 1 to 80% by weight of zeolite, from 1 to 80% by weight of the finely divided crystalline layered sodium disilicate according to the invention and from 0.5 to 5% by weight of modified cellulose.

Preferably, such detergents and cleaners comprise from 1 to 80% by weight of zeolite, from 1 to 80% by weight of crystalline sodium phyllosilicate, from 1 to 80% by weight of the finely divided crystalline layered sodium disilicate according to the invention and from 0.5 to 5% by weight of modified cellulose.

The abovementioned cellulose can, where appropriate, be chemically and/or mechanically modified.

Surprisingly, it has been found that the finely divided crystalline sodium disilicate according to the invention also has increased calcium-binding capacity.

The crystalline sodium disilicate according to the invention also produces considerably fewer residues compared with commercial crystalline sodium disilicates, which can be demonstrated using the sieve residue test. The meshes of the metal screening gauze used, with a mesh size of 20 $\mu$m, simulate the meshes of textile fabric. Instead of metal screening gauze it is also possible to use a polyester screening fabric having the same mesh size. In the sieve residue test, the finely divided crystalline layered sodium disilicates according to the invention have $d_{90}$ values below 60 $\mu$m, indicating considerably reduced sieve residues.

The finely divided crystalline sodium disilicate according to the invention can be used advantageously as a builder. It can be used over the whole spectrum of detergents which are customary nowadays, such as compact heavy-duty detergents, compact color detergents, heavy-duty detergents of lower bulk density etc.

Detergents which comprise the finely divided crystalline sodium disilicate according to the invention produce significantly fewer inorganic encrustations in model washing tests, which can be demonstrated by determining the ash. The latter remains when the fabric is incinerated.

Inorganic encrustations consist on the one hand from water hardness precipitated in the form of calcium carbonate and also of residues of detergent builders which have not completely dissolved or have settled out again. They reduce the wearing comfort of the laundry item by making it scratchy and reduce the durability. The use of the finely divided crystalline sodium disilicate in detergents thus produces a significant advantage in terms of longevity of the fabric and comfort when wearing.

The properties of the finely divided crystalline layered sodium disilicate according to the invention were determined using the following methods of measurement.

Determination of the Calcium-binding Capacity

A mixture of a buffer stock solution and deionized water is introduced into an ErWeKa dissolution tester, stirred and heated to 30° C. The buffer stock solution is an aqueous solution of glycine, sodium chloride, calcium chloride and sodium hydroxide in suitable concentrations. The calcium-sensitive electrode (model 932001 from Orion) is dipped into the solution and calibrated by replenishing the solution with a calcium stock solution. This is carried out using the evaluation unit EA 940 from Orion. After replenishing, the solution has a water hardness of 17 degrees German water hardness (17° German hardness). At the same time as the substance under investigation (1 g) is added, the Orion EA 940 is started. The pH of the measurement solution is 10.2. The Orion EA 940 gives the concentration of free calcium ions at specific time intervals. Using the known initial weight of calcium, the concentration of free, nonbonded calcium ions after 10 min is used to deduce the amount of bonded calcium, the calcium-binding capacity. This is given in mg of $CaCO_3$/g.

Determination of the Particle Size Distribution Using a Microtrac Granulometer

The particle size in an aqueous dispersion is determined using a Microtrac ASVR/FRA granulometer from Leeds and Northrup. The parameter measured is the reflection or diffraction of a laser beam on penetrating the dispersion. For this, 400 ml of ethanol are pumped through the laser measuring cell. The sample of solid (e.g. 70 mg) is metered in automatically, and the particle size distribution is determined after 10 min. The evaluation unit of the device calculates the $d_{50}$ and the $d_{90}$ value.

Determination of the Particle Size Distribution by Sieve Analysis

In a sieve machine from Retsch, the inserts with the desired sieves are used. The mesh size of the sieve decreases from top to bottom. 50 g of the powder to be investigated are placed onto the widest sieve. By vibrating the sieve machine, the powder material is conveyed through the various sieves. The residues on the sieves are weighed and related mathematically to the initial weight of material. The values can be used to calculate the $d_{50}$ and $d_{90}$ value.

Sieve Residue Test

For this, 800 ml of tap water [water hardness 14° German hardness] are heated to 20° C. and stirred using a propeller (straight-arm) stirrer. 2 g of the test substance are added and stirred for 20 minutes. Using the slight vacuum of a water-jet pump, the dispersion is sucked through a 20 $\mu$m metal sieve gauze. The sieve is dried at 80 to 100° C. for one hour in a circulating drying cabinet. The increase in weight is related to the initial weight and standardized to 100% and referred to as residue.

Preparation of the Test Detergent (Table 2)

The optical brighteners are stirred into a quarter of the nonionic amount and mixed with half of the amount of soda in a household multimixer (Braun). Using a Lödige plough share mixer, the remainder of the soda and all of the zeolite and Polymer are mixed for 15 minutes at 300 rpm. Half of the remaining amount of nonionics is then sprayed on in 5 minutes. The SKS-6 or the ground product is then added and mixed for 10 minutes. The remaining second half of nonionics is then sprayed on in a further 5 minutes. Finally, anionic, soap, antifoam, phosphonate and optical brighteners are added and then mixed for 10 minutes at 300 rpm. In a wobble mixer, the mixture from the Lödige mixer is admixed with perborate, TAED and enzymes with low shear stress and mixed for 15 minutes.

It is, of course, also possible to change the order in which the substances are added.

Washing Tests

In a standard domestic washing machine (model: Novotronic 927 WPS, Miele) specific test fabrics are washed repeatedly (15 times) at 60° C. and a water hardness of 18° German hardeners using the test detergent in an amount of 65 g of test detergent/wash cycle. The test fabrics, which are, in particular, a cotton terry fabric (Vossen), in each case a cotton double-rib fabric, polyester/cotton blend (type 20A) and standard cotton fabric (type 10A) from Wäschereiforschung Krefeld Testgewebe GmbH and a standard cotton fabric from the Swiss Materials Testing Institute, St. Gallen, Switzerland, are supplemented with further laundry ballast (3.75 kg). After 15 washes, a sample is taken from each of the fabrics and ashed in a muffle oven at a temperature of 1000° C. for a period of 24 hours.

EXAMPLE 1 (Comparison)

10 kg of commercially available SKS-6 (Clariant GmbH, Frankfurt) are placed in portions onto an electric vibrating sieve (model TMA 3070 from Siemens) having a metal sieve of mesh size 1000 μm. The starting material has the following particle size distribution according to this sieve analysis:

>1000 μm: 5.5%
>500 μm: 19.8%
>300 μm: 27.9%
>150 μm: 42.2%
>75 μm: 63.2%
$d_{50}$=122 μm
$d_{90}$=843 μm

The undersize material obtained was about 9 kg of SKS-6 powder having the following particle size distribution (sieve analysis):

>1000 μm: 0.2%
>850 μm: 0.4%
>710 μm: 2.15%
>500 μm: 6.9%
>300 μm: 13.7%
>150 μm: 26.9%
$d_{50}$=68 μm
$d_{90}$=321 μm

The sieve residue test gave 91.3% of residue.

EXAMPLE 2 (Comparison)

SKS-6 powder was sieved as in Example 1. The starting material had the following phase distribution: alpha-disodium disilicate 5.6%, beta-disodium disilicate 2.3%, delta-disodium disilicate 90.4%, amorphous component 1.4%.

It had the following particle size distribution according to sieve analysis:

>1000 μm: 3.4%
>500 μm: 17.5%
>300 μm: 26.6%
>150 μm: 44.6%
>75 μm: 65.9%
$d_{50}$=131 μm
$d_{90}$=766 μm

The undersize material obtained was about 8 kg of SKS-6 powder having the following particle size distribution (sieve analysis):

>500 μm: 0.1%
>300 μm: 9.1%
>150 μm: 29.8%
>100 μm: 51.7%
$d_{50}$=81 μm
$d_{90}$=245 μm

The sieve residue test gave 86.9% of residue.

EXAMPLE 3 (Comparison)

SKS-6 powder was sieved as in Example 1. The starting material had the following phase distribution: alpha-disodium disilicate 10.8%, beta-disodium disilicate 4.4%, delta-disodium disilicate 79.4%, amorphous component 5.4%.

It had the following particle size distribution according to sieve analysis:

>1000 μm: 4.4%
>500 μm: 18.3%
>300 μm: 26.9%
>150 μm: 43.6%
>75 μm: 64.4%
$d_{50}$=127 μm
$d_{90}$=799 μm

The oversize material was ground in a ball mill for 3 h using a U 280A0 ball mill from Welte which is lined on the inside with metal and whose drum rotates at about 50 rpm. The grinding media used are 44 kg of porcelain balls with diameters of 1.8, 2.9, 3.5 and 5 cm. Sieving was then carried out again. The undersize fractions, a total of 9 kg, were combined and had the following particle size distribution (sieve analysis):

>150 μm: 13.8%
>75 μm: 44.3%
>63 μm: 54.3%
>53 μm: 67.1%
$d_{50}$=72 μm
$d_{90}$=157 m

The sieve residue test gave 73.5% of residue.

EXAMPLE 4 (Invention)

10 kg of SKS-6 powder were ground as in Example 3. It had the following particle size distribution according to sieve analysis:

>1000 μm: 3.9%
>500 μm: 19.5%
>300 μm: 28.8%
>150 μm: 47.1%
>75 μm: 68.6%

$d_{50}$=140 µm $d_{90}$=805 µm

The resulting ground product (about 10 kg) has the following particle size distribution (Microtrac):

>53 µm: 0.5%

>33 µm: 10%

>20 µm: 30.6%

$d_{50}$=11.9 µm $d_{90}$=33.9 µm

The ground product had the following phase distribution: alpha-disodium disilicate 22.0%, beta-disodium disilicate 12.1%, delta-disodium disilicate 65.3%, amorphous component 0.6%. The sieve residue test gave 20.3% of residue.

EXAMPLE 5 (Invention)

SKS-6 powder was ground in an Aeroplex fluidized-bed counter-jet mill from Hosokawa-Alpine AG (type AFG-200) at a material feed of 6–10 kg/h and a classifier disk rotation of 6000 rpm. It had the following particle size distribution according to sieve analysis:

>1000 µm: 5.8%

>500 µm: 20.0%

>300 µm: 28.3%

>150 µm: 45.5%

>75 µm: 68.6%

$d_{50}$=135 µm $d_{90}$=852 µm

The resulting ground product (about 600 kg) gave the following particle size distribution (Microtrac):

$d_{50}$=5.5 µm $d_{90}$=12 µm

The ground product had the following phase distribution: alpha-disodium disilicate 10.6%, beta-disodium disilicate 6.9%, delta-disodium disilicate 80.3%, amorphous component 2.3%. The sieve residue test gave 21.1% of residue.

EXAMPLE 6 (Invention)

1000 kg of SKS-6 with the particle size distribution of the starting material of Example 1 were ground in a pendulum roller mill (model PM00) from Neuman & Esser with a rotating classifier, fan, dust collector and filter unit. The throughput was 83.5 kg/h (material to the filter: 5.5 kg/h, air pressure in the air classifier: 290 mm WC).

a) At a classifier speed of 250 rpm, a ground product having the following particle size distribution (Microtrac) was obtained: <1 µm: 0.6%, <1.5 µm: 1.2%, <2 µm: 3.3%, <3 µm: 6.2%, <4 µm: 8.7%, <6 µm: 12.6%, <8 µm: 16.9%, <12 µm: 24.8%, <16 µm: 33.1%, <24 µm: 49.8%, <32 µm: 67.2%, <48 µm: 89.8%, <64 µm: 96.2%, <96 µm: 100%, $d_{50}$=24.1 µm, $d_{90}$=48.5 µm At a higher speed, finer material is also separated off in the classifier (b and c):

b) At a classifier speed of 340 rpm, a ground product having the following particle size distribution (Microtrac) was obtained: <1 µm: 0.5%, <1.5 µm: 1.1%, <2 µm: 3.5%, <3 µm: 6.3%, <4 µm: 8.5%, <6 µm: 13.3%, <8 µm: 18.2%, <12 µm: 27.8%, <16 µm: 36.3%, <24 µm: 56.8%, <32 µm: 74.9%, <48 µm: 93.6%, <64 µm: 98.8%, <96 µm: 100%, $d_{50}$=21.4 µm, $d_{90}$=44.9 µm c) At a classifier speed of 450 rpm, a ground product having the following particle size distribution (Microtrac) was obtained: <1 µm: 0.6%, <1.5 µm: 1.5%, <2 µm: 4.8%, <3 µm: 8.8%, <4 µm: 12.8%, <6 µm: 18.5%, <8 µm: 24.6%, <12 µm: 37.8%, <16 µm: 53.8%, <24 µm: 81.2%, <32 µm: 93.7%, <48 µm: 100.0%, $d_{50}$=15.1 µm, $d_{90}$=29.6 µm The ground products had the following phase distributions: alpha-disodium disilicate 8.3%, beta-disodium disilicate 7.5%, delta-disodium disilicate 82.8%, amorphous component 1.4%.

TABLE 1

Sieve residue and calcium-binding capacity

|  | Residue in the sieve residue test [%] | calcium-binding capacity [mg CaCO$_3$/g] |
| --- | --- | --- |
| Example 1 | 91.3 | 180 |
| Example 2 | 86.9 | 182 |
| Example 3 | 73.5 | 180 |
| Example 4 | 20.3 | 191 |
| Example 5 | 21.1 | 196 |
| Example 6c | 25.2 | 191 |

EXAMPLE 7 (Invention)

In accordance with the general procedure "Preparation of the test detergent", a test compact heavy-duty detergent comprising 31% by weight of finely divided crystalline sodium disilicate from Example 4 was prepared. In model washing tests in accordance with the general procedure "Washing tests", the formation of inorganic encrustation was investigated. The mean value of the ash values for all five fabrics is 1.50%

EXAMPLE 8 (Invention)

In accordance with the general procedure "Preparation of the test detergent", a test compact color detergent comprising 35% by weight of finely divided crystalline sodium disilicate from Example 4 was prepared. In model washing tests in accordance with the general procedure "Washing tests", the formation of inorganic encrustation was investigated. The mean value of the ash values for all five fabrics is 1.53%

EXAMPLE 9 (Invention)

In accordance with the general procedure "Preparation of the test detergent", a test compact heavy-duty detergent comprising 12% by weight of finely divided crystalline sodium disilicate from Example 5 was prepared. In model washing tests in accordance with the general procedure "Washing tests", the formation of inorganic encrustation was investigated. The mean value of the ash values for all five fabrics is 1.71%

EXAMPLE 10 (Invention)

In accordance with the general procedure "Preparation of the test detergent", a test heavy-duty detergent comprising 4% by weight of finely divided crystalline sodium disilicate from Example 6c was prepared. In model washing tests in accordance with the general procedure "Washing tests", the formation of inorganic encrustation was investigated. The mean value of the ash values for all five fabrics is 1.86%

EXAMPLE 11 (Comparison)

In accordance with the general procedure "Preparation of the test detergent", a test detergent comprising 12% by weight of SKS-6 from Example 1 was prepared. In model washing tests in accordance with the general procedure "Washing tests", the formation of inorganic encrustation was investigated. The mean value of the ash values for all five fabrics is 2.54%

TABLE 2

Composition of the test detergent

| | Ex. 7 [%] | Ex. 8 [%] | Ex. 9 [%] | Ex. 10 [%] | Ex. 11 [%] |
|---|---|---|---|---|---|
| Zeolite A | 0 | 0 | 19 | 17 | 19 |
| SKS-6 | 31 | 35 | 12 | 4 | 12 |
| Polymer | 5 | 5 | 5 | 5 | 5 |
| Soda | 16 | 0 | 16 | 15 | 16 |
| Bicarbonate | 0 | 15 | 0 | 0 | 0 |
| Percarbonate | 18 | 0 | 0 | 0 | 0 |
| Perborate monohydrate | 0 | 0 | 18 | 0 | 18 |
| Perborate tetrahydrate | 0 | 0 | 0 | 20 | 0 |
| TAED | 5 | 0 | 5 | 2.5 | 5 |
| LAS | 10 | 7 | 10 | 10 | 10 |
| Nonionics | 8 | 10 | 8 | 5 | 8 |
| Soap | 2 | 1.5 | 2 | 2 | 2 |
| Antifoam | 1 | 0.5 | 1 | 1 | 1 |
| Enzyme I | 1.5 | 1 | 1.5 | 0.7 | 1.5 |
| Enzyme II | 1.5 | 1 | 1.5 | 0.7 | 1.5 |
| Optical brightener I | 0.25 | 0 | 0.25 | 0.15 | 0.25 |
| Optical brightener II | 0.25 | 0 | 0.25 | 0.15 | 0.25 |
| Phosphonate | 0.5 | 0 | 0.5 | 0.3 | 0.5 |
| Sodium citrate | 0 | 2 | 0 | 0 | 0 |
| Polyvinylpyrrolidone | 0 | 1 | 0 | 0 | 0 |
| Soil release polymer | 0 | 1 | 0 | 0 | 0 |
| CMC | 0 | 1 | 0 | 0 | 0 |
| Sulfate | remainder | remainder | remainder | remainder | remainder |
| Dosage [g/wash] | 65 | 65 | 65 | 130 | 65 |
| Ash [%] | 1.50 | 1.53 | 1.71 | 1.86 | 2.54 |

| Substances used: | |
|---|---|
| Zeolite A: | Wessalith P, Degussa |
| SKS-6: | Phyllosilicate SKS-6 powder, Clariant |
| Polymer: | Sokalan CP5, BASF |
| Soda: | Heavy soda, Matthes & Weber |
| Bicarbonate: | Solvay |
| Percarbonate: | Oxyper C, Solvay Interox |
| Perborate monohydrate: | Degussa |
| Perborate tetrahydrate: | Degussa |
| TAED: | TAED 4049, Clariant |
| Anionic | ARL, Hüls |
| Nonionics: | Genapol OAA 080, Clariant |
| Soap: | Liga soap base HM11E |
| Antifoam: | 11.powder.ASP3, Wacker |
| Enzyme I: | Termamyl 60T, Solvay Enzymes |
| Enzyme II: | Savinase 6.0 TW, Solvay Enzymes |
| Optical brightener I: | Tinopal CBS-X, Ciba |
| Optical brightener II: | Tinopal DMS-X, Ciba |
| Phosphonate: | Dequest 2041, Monsanto |
| Sodium citrate: | from Fluka |
| Polyvinylpyrrolidone: | Sokalan HP50, BASF |
| Soil release polymer: | SRC 1, Clariant |
| CMC: | Tylose 2000, Clariant |
| Sulfate: | Light sulfate, Solvay |

What is claimed is:

1. A finely divided crystalline layered sodium disilicate of the formula

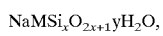

NaMSi$_x$O$_{2x+1}$yH$_2$O, where M is sodium or hydrogen, x is a number from 1.9 to 4, and y is a number from 0 to 20, which comprises from 0 to 40% by weight of alpha-disodium disilicate from 0 to 40% by weight of beta-disodium disilicate, from 40 to 100% by weight of delta-disodium disilicate,
from 0 to 40% by weight of amorphous components, said layered silicate having a calcium-binding capacity of more than 170 mg of CaCO$_3$/g at 30° C. and 17° German hardness, and said layered silicate having a sieve residue of less than 60%, wherein said layered silicate is obtained by a process which comprises grinding a sodium phyllosilicate having a particle diameter d$_{50}$ of from 80 to 400 μm to a d$_{90}$ value of less than 100 μm.

2. The finely divided crystalline layered sodium disilicate as claimed in claim 1, which comprises
from 0 to 20% by weight of alpha-disodium disilicate
from 0 to 30% by weight of beta-disodium disilicate
from 50 to 95% by weight of delta-disodium disilicate
from 0 to 20% by weight of amorphous components.

3. The finely divided crystalline layered sodium disilicate as claimed in claim 1, which comprises
from 0 to 10% by weight of alpha-disodium disilicate
from 0 to 15% by weight of beta-disodium disilicate
from 70 to 90% by weight of delta-disodium disilicate
from 0 to 10% by weight of amorphous components.

4. The finely divided crystalline layered sodium disilicate as claimed in claim 1, which is free from sodium metasilicate.

5. The finely divided crystalline layered sodium disilicate as claimed in claim 1, which has a d$_{90}$ value of <100 μm.

6. The finely divided crystalline layered sodium disilicate as claimed in claim 1, which has a d$_{90}$ value of <60 μm.

7. The finely divided crystalline layered sodium disilicate as claimed in claim 1, which has a calcium-binding capacity of more than 180 mg of CaCO$_3$/g at 30° C. and 17° German hardness.

8. The finely divided crystalline layered sodium disilicate as claimed in claim 1, which has a calcium-binding capacity of more than 190 mg of CaCO$_3$/g at 30° C. and 17° German hardness.

9. The finely divided crystalline layered sodium disilicate as claimed in claim 1, which has a sieve residue of less than 40%.

10. The finely divided crystalline layered sodium disilicate as claimed in claim 1, which has a sieve residue of less than 30%.

11. The finely divided crystalline layered sodium disilicates as claimed in claim 1, which comprises grinding a sodium phyllosilicate having a particle diameter d$_{50}$ of from 80 to 400 μm to a d$_{90}$ value of less than 60 μm.

12. The finely divided crystalline layered sodium disilicates as claimed in claim 1 wherein the grinding is carried out in a vibrating mill, ball mill, roller mill, pendulum roller mill or air-jet mill.

13. A process for the preparation of detergents or cleaners including dishwashing detergents comprising combining the finely divided crystalline layered sodium disilicates as claimed in claim 1 with active ingredients and auxiliaries.

14. A process for the use of finely divided crystalline layered sodium disilicates as claimed in claim 1 comprising incorporating said disilicates in detergents or cleaners including dishwashing detergents as a builder.

15. A detergent or cleaner which comprises from 1 to 80% by weight of the finely divided crystalline layered sodium disilicate as claimed in claim 1.

16. A detergent or cleaner which comprises from 1 to 80% by weight of zeolite and from 1 to 80% by weight of the finely divided crystalline layered sodium disilicate as claimed in claim 1.

17. A detergent or cleaner which comprises from 1 to 80% by weight of zeolite, from 1 to 80% by weight of crystalline sodium phyllosilicate and from 1 to 80% by weight of the finely divided crystalline layered sodium disilicate as claimed in claim 1.

18. A detergent or cleaner, which comprises from 1 to 80% by weight of the finely divided crystalline layered sodium disilicate as claimed in claim 1 and from 1 to 10% by weight of citric acid or salts of citric acid.

19. A detergent or cleaner, which comprises from 1 to 80% by weight of zeolite, from 1 to 80% by weight of the finely divided crystalline layered sodium disilicate as claimed in claim 1 and from 1 to 10% by weight of citric acid or salts of citric acid.

20. A detergent or cleaner, which comprises from 1 to 80% by weight of the finely divided crystalline layered sodium disilicate as claimed in claim 1 and from 0.5 to 5% by weight of modified cellulose.

21. A detergent or cleaner, which comprises from 1 to 80% by weight of zeolite, from 1 to 80% by weight of the finely divided crystalline layered sodium disilicate as claimed in claim 1 and from 0.5 to 5% by weight of modified cellulose.

22. A detergent or cleaner, which comprises from 1 to 80% by weight of zeolite, from 1 to 80% by weight of crystalline sodium phyllosilicate, from 1 to 80% by weight of the finely divided crystalline layered sodium disilicate as claimed in claim 1 and from 0.5 to 5% by weight of modified cellulose.

23. The detergent or cleaner as claimed in claim 20, wherein the cellulose can be chemically and/or mechanically modified.

* * * * *